(12) United States Patent
Hunt

(10) Patent No.: US 6,909,454 B2
(45) Date of Patent: Jun. 21, 2005

(54) CALIBRATION TECHNIQUES IN FLYING SPOT SCANNERS & TELECINE MACHINES

(75) Inventor: Stuart William Arundell Hunt, Hertford (GB)

(73) Assignee: Cintel International Limited, Hertfordshire (GB)

( * ) Notice: Subject to any disclaimer, the term of this patent is extended or adjusted under 35 U.S.C. 154(b) by 758 days.

(21) Appl. No.: 09/827,735

(22) Filed: Apr. 6, 2001

(65) Prior Publication Data

US 2002/0033883 A1 Mar. 21, 2002

(30) Foreign Application Priority Data

Apr. 7, 2000 (GB) .............................................. 0008662

(51) Int. Cl.$^7$ ........................ H04N 5/253; H04N 5/257; H04N 9/47
(52) U.S. Cl. ........................... 348/96; 348/100; 348/108
(58) Field of Search .......................... 348/108, 96, 100, 348/209.99; 382/312; 359/17; 358/474, 485

(56) References Cited

U.S. PATENT DOCUMENTS

| | | | | |
|---|---|---|---|---|
| 3,875,582 A | * | 4/1975 | Yagi et al. ..................... 386/43 |
| 3,968,404 A | * | 7/1976 | Vidal .......................... 315/398 |
| 4,823,204 A | * | 4/1989 | Holland ....................... 386/130 |
| 4,903,131 A | * | 2/1990 | Lingemann et al. .......... 348/97 |
| 5,155,596 A | * | 10/1992 | Kurtz et al. .................... 348/97 |
| 5,185,668 A | * | 2/1993 | Ohta ............................. 348/97 |
| 5,319,472 A | * | 6/1994 | Hill et al. ..................... 358/500 |
| 5,420,421 A | | 5/1995 | Lindgren et al. ......... 250/252.1 |
| 5,469,209 A | * | 11/1995 | Gunday et al. ................ 348/96 |
| 5,600,450 A | * | 2/1997 | Kaye et al. .................. 358/474 |
| 5,784,529 A | * | 7/1998 | Richmond ................... 386/128 |
| 5,982,427 A | * | 11/1999 | Hunt et al. .................. 348/254 |

FOREIGN PATENT DOCUMENTS

GB 2 314 988 A 1/1998 ............ H04N/3/36

OTHER PUBLICATIONS

Search Report from United Kingdom Application No. GB 0108902.8, dated Oct. 9, 2001.

* cited by examiner

Primary Examiner—Vu Le
(74) Attorney, Agent, or Firm—McDonnell Boehnen Hulbert & Berghoff LLP

(57) ABSTRACT

A method of calibrating the light system in a flying spot scanner or telecine machine using a cathode ray tube light source and a photosensitive detector, wherein at a first level of light transmitted to the photosensitive detector a control signal to the photosensitive detector is adjusted to obtain a predetermined video signal, and the value of the control signal is noted; at a plurality of other levels of light transmitted to the photosensitive detector, the control signal to the photosensitive detector is adjusted to obtain the predetermined video signal, and the values of the respective control signals are noted; and a lookup table is created of calibration values for different levels of light, so that during normal operation of the telecine machine values in the table can be used to obtain calibration information for different levels of light transmitted to the photosensitive detector.

21 Claims, 2 Drawing Sheets

CALIBRATION TECHNIQUES IN FLYING SPOT SCANNERS & TELECINE MACHINES

RELATED APPLICATIONS

Priority is claimed to U.K. Patent Application No. GB00086662.9, filed Apr. 7, 2000.

FIELD OF THE INVENTION

This invention relates to calibration techniques in flying spot scanners and telecine machines.

BACKGROUND OF THE INVENTION

There have been for many years systems to convert cinematographic motion picture film into electrical signals for television broadcast or video cassette production. These machines are commonly referred to as 'Telecine' machines. Such examples of these machines includes the 'URSA' telecine from Cintel International Ltd, and the 'SPIRIT' Telecine from Phillips Digital Video in Darmstadt, Germany, and the applicant's own 'Millenium Machine' These telecine machines need to 'scan' the cinematographic film. This is accomplished in the SPIRIT system by the use of a CCD (Charge Coupled Device) and more relevantly to this invention, by the use of a CRT (Cathode Ray Tube) in the Cintel International URSA machine.

The use of CRT (Cathode Ray Tubes) for the use of film scanning is not new. It has been known at least as long ago as 1975, where it was used in the Rank Cintel Mk III Telecine. In this system, the film is 'scanned', by the imaging of a scanned 'raster' patch on the front of the CRT being imaged onto the film, and the collected light transmitted through the film being collected by photosensitive devices. These photosensitive devices are quite often photomultiplier tubes. These photomultiplier tubes convert the incident light into an electrical signal that is dependant on the amount of light, and thus dependant on the density of the film at any point scanned. It is well known that such devices require a voltage to be applied to them, and that the signal resulting from these devices is dependant on the voltage level applied to the device.

It is often necessary to calibrate this light measuring system, for many reasons. Firstly it is desirable to have a measurement of the actual density of the film present in the telecine gate, rather than just a relative measurement of how much lighter or darker one portion of the film is with respect to another. Secondly, the light emitted from the CRT is variable, and as a CRT ages, the light emitted from the phosphors tends to decrease for a given drive current. Further, the signal received from the photomultipliers is dependent on the electrical gain provided on these devices. There is also potentially an 'aging' effect in the photomultiplier tubes, resulting in less signal for a given amount of incident light and gain voltage.

Telecine machines are often used in conjunction with Telecine programmers. Such devices include the 'POGLE Platinum' from Pandora International Ltd., of Northfleet, Kent, England. These devices are used to 'store' control adjustment parameters for later recall. These parameters relate to editorial alterations to particular scenes (or even film frames) of a given film reel. Naturally, it is desirable to be able to view the 'red' colour of a woman's dress from a particular scene on a roll of film, and several weeks later to view that same scene, with the same stored control parameters, and see the same 'red' hue. Thus the stored telecine parameters must produce the same rendered colours day-in and day-out. The electrical signal necessary to be applied to the photomultipliers to produce that hue from that film will vary slightly, according to the age of the photomultiplier devices, thermal drift in the control circuitry, and thermal effects in the photomultiplier. It can be seen that some 'calibration' mechanism is necessary to be able to reproduce hues repeatably and reliably.

There have been attempts to regulate the CRT system. For example, it has been known for many years to use a technique called 'burn correction'. This basic technique was disclosed in the now abandoned German patent application DE-OS-25 25 073, published on 18th Dec. 1975. Burn correction works by measurement of the emitted light from the CRT at any moment in time both directly from the CRT face, to derive a 'burn' signal, and also through the film, to derive an image signal. Thus if the part of the CRT face we are using (or indeed the whole CRT face) is emitting less light than elsewhere (or previously) then we can correct for this in the light collected after passing through the film. For example, if the CRT light were to drop by 10% as measured by the 'burn' corrector, the light collected by the image sensing photomultipliers would be measured relative to this '90%' light value rather than the assumed 100% that would be assumed without 'burn' correction. Having effectively provided a control mechanism to ensure that the CRT at least appears to give a constant amount of light, the area that we wish to describe here is the calibration of the light sensors.

There have been several proposals in the attempt to calibrate the photomultiplier response to the light level from the CRT. One such proposal is disclosed in patent GB 2 241 625, by Rank Cintel Ltd. This method teaches how to carry out a 'two point calibration' for the system. The steps for this are to set the CRT beam current to a nominal 'low' level, typically 15 Microamps, and to then alter the PEC drive voltage to produce a 'peak electrical signal'. This is repeated with a 'maximum' beam current, typically 300 microamps, where the PEC drive voltage is again varied to get the 'peak electrical signal'. This data is used to create a 'straight line relationship' between PEC gain and PEC drive voltage.

This method is inherently flawed, as the characteristic of PEC gain to drive voltage departs significantly from a linear or exponential characteristic at certain drive levels and is not repeatable from one PEC to another.

SUMMARY OF THE INVENTION

Viewed from one aspect of an invention disclosed herein, therefore, there is provided a method of calibrating the light system in a flying spot scanner or telecine machine using a cathode ray tube light source and a photosensitive detector, wherein at a first level of light transmitted to the photosensitive detector a control signal to the photosensitive detector is adjusted to obtain a predetermined video signal, and the value of the control signal is noted; at a plurality of other levels of light transmitted to the photosensitive detector, the control signal to the photosensitive detector is adjusted to obtain the predetermined video signal, and the values of the respective control signals are noted; and a lookup table is created of calibration values for different levels of light transmitted to the photosensitive detector, so that during normal operation of the telecine machine values in the table can be used to obtain calibration information for different levels of light transmitted to the photosensitive detector.

The different light levels could be obtained by inserting filters of different known density in the light path. In such a method the CRT drive current would be set at full beam, and the photosensitive detector control voltage adjusted to obtain a predetermined video signal, say of half video full volts. This starting level is not really important, as long as the level chosen is not too near full video or zero video. A known optical filter that would, for example, absorb one half of the light is inserted in the light path. The Photosensitive detector gain is increased in this condition to obtain half video signal. Similarly, an optical filter that absorbs three quarters of the light can be used, and the Photosensitive detector gain adjusted to a point where the image signal is still one half of the maximum video signal. This could be repeated to produce a calibrated response for the telecine at all, or at least a large number of, light levels. This characteristic could be stored, and utilised as a 'look up' table in a digital circuit. Ideally, this would be repeated at many points. These points would typically be at 1 dB (decibel) intervals.

This technique, unlike the technique described in GB 2 241 625, can be implemented with the 'burn correction' enabled because the drive current to the CRT is not varied. It is therefore a method of calibrating the Photosensitive detectors in a realistic operational state, rather than in an unrepresentative state. However, it is not an entirely satisfactory technique. It is undesirable to use reference filters for many reasons, including the time taken, the manual intervention necessary, and the fact that the 'reference' filters may be easily damaged, and will in time change in density. A great many filters would be needed to produce a good characteristic.

The actual technique described in GB 2 241 625 does not use filters, although because it involves only maximum and minimum measurements it might be a feasible technique. In GB 2 241 625 the light level is varied by varying the drive current to the CRT. However, in practice this requires that "burn correction" be disabled during the calibration process.

A 'burn' (or grain) correction system is intended to calibrate the signals obtained by the image sensor based on the light output of the CRT, and detects the light output from the CRT directly, before it passes through the film. If the CRT beam current were to be decreased from full drive to one half drive during a calibration step, the 'burn' detector will notice that the reference level has dropped to one half, and the image signal will be corrected to allow for this by dividing the image signal by the burn signal, thus resulting a full scale image signal at all beam currents. Clearly this will not allow the production of a representative characteristic.

However, disabling 'burn' correction during calibration will not give reliable results. 'Burn' correction alters the characteristics of a telecine significantly, as amongst other things it corrects for the phenomenon of CRT 'grain'. This effect is caused by the fact that although the phosphor used in the CRT is a fine powder, it still has a granular structure. Thus there is a small random variation in light level as the CRT spot passes along the scan line, as phosphor granules are hit both centrally and peripherally. These signal variations occur differentially in all three colours, as the phosphor used for telecine CRTs is often composed of three or more separate phosphors. It is hardly surprising that calibrating the PEC system with 'burn' correction disabled, and then enabling burn correction for the transfer of images produces non-optimal results.

According to one aspect of an invention disclosed herein, therefore, there is a provided a method of calibrating the light system in a flying spot scanner or telecine machine using a cathode ray tube light source, a photosensitive detector, and a burn corrector system, the burn corrector system being operative during the calibration and serving to adjust a control signal for the photosensitive detector in accordance with variations in the output of the cathode ray tube, wherein at a first level of drive current for the cathode ray tube a control signal to the photosensitive detector is adjusted to obtain a desired video signal parameter, and the value of the control signal is noted; at a plurality of other levels of cathode ray tube drive current, the control signal to the photosensitive detector is adjusted to obtain desired video signal parameters, and the values of the respective control signals are noted; and a lookup table is created of calibration values for different levels of light transmitted to the photosensitive detector, so that during normal operation of the telecine machine values in the lookup table can be used to obtain calibration information for different levels of light transmitted to the photosensitive detector; wherein the video signal parameters are virtual video signal levels taking into account signals from the burn detector.

By working with virtual signal levels, in a software emulation, it is possible to have burn correction operative. If this was done and real video signals were used, they would be out of range.

The invention further extends to software and apparatus for implementing the calibration method of the invention.

It will be appreciated that the methods, software and apparatus of the invention could be used in a flying spot scanner or telecine using any type of photosensitive device including for example, photomultiplier tubes, photdetectors, avalanche photodiodes or any other suitable devices.

BRIEF DESCRIPTION OF THE DRAWINGS

Preferred embodiments of the invention will now be described by way of example only and with reference to the accompanying drawings in which.

DESCRIPTION OF THE PREFERRED EMBODIMENTS

Figure 1:
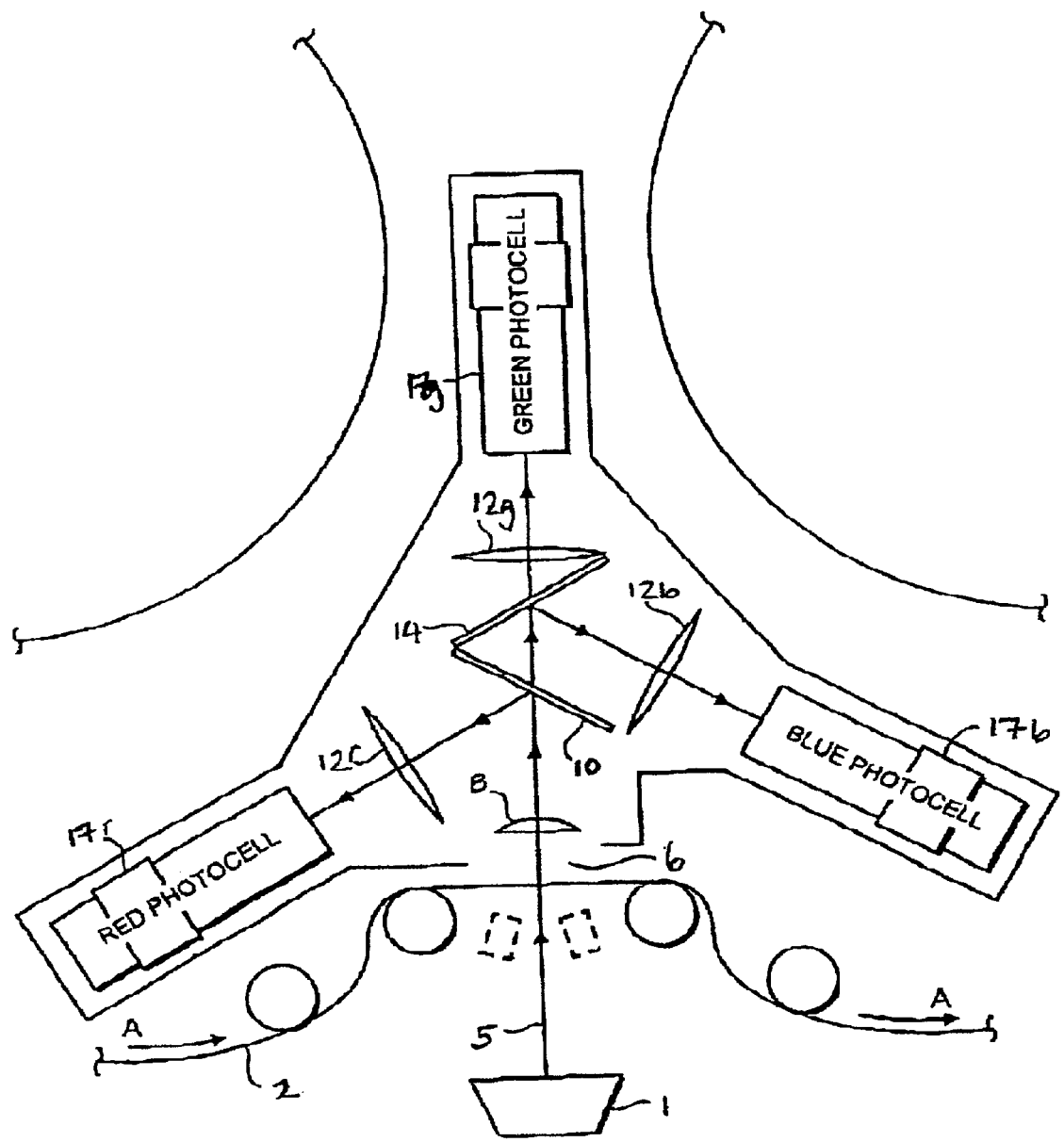
FIG. 1 schematically shows the layout of a flying spot scanner or telecine system.

FIG. 1 shows a schematic layout of a telecine machine of the type with which the method of the invention is to be used.

As shown, a light source in the form of a cathode ray tube 1 is provided. Cinematographic film 2 is supported so as to be passed through the telecine machine in direction A.

The cathode ray tube gives off light 5 in the form of a scanning raster patch in use. The light 5 emitted from the cathode ray tube 1 passes through the film 2 and is modulated by it. The modulated light 6 passes through a focusing lens 8, after which it contacts a first dichroic mirror 10 which causes the red component of the light to be focussed by a lens 12r onto a red photosensitive detector 17r.

The blue and green elements of the modulated light 6 pass through the first dichroic mirror 10 to a second dichroic mirror 14. This mirror causes the blue light to be deflected via a focussing lens 12b onto a blue photosensitive detector 17b. The green light passes through the second dichroic mirror 14 and is focussed via a lens 12g onto a green photosensitive detector 17g. The light signals collected by the red, green and blue photodetectors are converted to digital signals and are transmitted directly or stored as a digital representation of the images on the cinematographic film.

One aspect of the telecine machine which is not shown in FIG. 1 is the burn correction system which includes means for measuring the red, green and blue components of the light 5 emitted from the cathode ray tube 1 before it is modulated by the film 2 and modifying the signals obtained by the red 17r, green 17g and blue 17b photosensitive detectors to account for variations in the level of light emitted from different parts of the face of the cathode ray tube 1.

In a preferred telecine machine using the calibration method of the invention, the red 17r, green 17g and blue 17b photosensitive detectors used in image detection are photomultipliers supplied by Electron Tubes Ltd. of Ruislip, Middlesex, UK. The means for measuring the red, green and blue components of the light emitted directly from the cathode ray tube for use in burn correction are photodetectors supplied by Hamamatsu of Tokyo, Japan as part number S359-08. Analog to Digital converters are used to convert the signals obtained by the photodetectors to digital signals and the converters used are part number A/D 9071, supplied by Analog Devices of California, USA.

In implementing the invention, a first step will usually be to disable the 'shading correction' aspects of the telecine. Shading correction is a position based correction to allow for (amongst other things) non linear illumination of the optical system, and has been known since at least 1975 as incorporated in the Rank Cintel Mk III telecine.

Black level clamping systems are also provided in both the burn detection system and the image detection parts of the telecine machine for use with the invention. These clamping systems modify the digital output obtained from the Analog to Digital converters so that there is always at least a small positive output from the A to D converters. Thus, for example the clamps could be designed to provide a digital video output of 16 on an 8 bit video scale of 0 to 255 when no light is detected as in this way the system can tell when the output is too low due to drift in the A/D converter.

It will of course be appreciated that the small positive value applied by the clamp will be digitally subtracted from the final digital signals obtained. The black level clamping systems will however contain small inaccuracies and where the light level detected may be very small these can have a significant effect. Thus, in the calibration method of the invention the error in the output of the black level clamps in the burn detection system is measured and then allowed for in the calibration.

As an additional preliminary step in the calibration method therefore, the digital outputs corresponding to light levels read by each of the red, green and blue photodetectors in the burn detector when no light is incident on them are measured. These values show the minimum digital value applied to the black video signals by the black level clamps and from these errors in the black level clamping system can be identified.

The next step which implements the main calibration is carried out with no film present but with the burn correction system operative, measuring directly the light output from the CRT. The CRT is driven at full drive current to provide maximum light output. A small illumination patch at the centre of the tube (typically 50×50 pixels) is analysed to measure both a burn signal (value B) and an image signal (value I). For this example the initial value of I may be 0.5. In practice, any value between 0 and 1.0 could be used. Note that having the value of I too near to 1.0 is not desirable as 'headroom' is needed. For example, it may be desirable to not reproduce 'empty gate' as 'peak white' video. The level of light output is represented in digital form as a 16 bit quantisation, where zero is represented by 0000 and full signal is represented by FFFF in the Hexadecimal numerical system.

Whatever nominal value of I is chosen, the value of I (which is the signal read by the photodetector which provides image signals during scanning) is held constant for varying CRT beam current used during the calibration process. This is achieved by adjusting the voltage applied to the photosensitive detector. The voltage or gain which is applied to the photosensitive detector to obtain the desired signal I at each different beam current is recorded by the calibration system together with the burn information given below.

Next, there is derived a ratio (Value R) of these two values, being the Image value (I) divided by the Burn value (B).

In the calibration method of the invention, the CRT beam current is set to a first level of approximate known ratio to the previous level. This ratio could be ½, although it must be understood that other values could be used. In the case of a CRT drive current of 150 microamps (half the 300 microamps full drive current) twice the gain (or voltage) will be needed at the photosensitive detector to produce the nominal 0.5 image signal (uncorrected). However, since the burn correction is enabled, this burn corrected signal will be a nominal 1.0. If this process is repeated, and for example the CRT drive current is again halved, then the 'burn corrected' image signal will tend to 2.0 of full scale video. Thus 'overload' would happen, and no sensible measurements could be made, as video electronic circuits cannot handle more than 'full scale' video represented by FFFF. Thus, the system of the invention provides means for calculating what the burn corrected video signal would be to allow the calibration method to be carried out.

The calibration system of the present invention therefore involves a system which works with a 'virtual' image signal, with burn correction, outside the useable operational digital range. This can be derived by a software implementation of the burn circuitry. This software implementation could for example be programmed in the "C" programming language and could run on an Industry standard personal computer using an Intel Pentium processor running at 75 MHz.

In software implementations of algorithms it is possible to exceed the levels of electronic video signals. It will be shown in the example below that whilst the corrected video signal would be 'out of range' in terms of electrical signals, both the uncorrected signal and the 'burn' signal are producing tangible values. Whilst the corrected video signal would be well in excess of the maximum values allowed, it is possible to utilise the 'in range' uncorrected signals and 'in range' values to feed into a software model of the burn correction system, which will calculate the value of the video signal that would occur if the video circuitry had sufficient range.

The CRT beam current can then be reduced further, by typically another factor of two, and the burn corrected signal for this light level calculated according to the algorithms above.

The examples below show the calculation of "virtual" burn correction video signals using the system described above. Whilst the examples below have only a few points, it is realised that for the best effect a large number of points should be analysed. A typical table of the values measured and calculated is produced below, Table 1. Note that for the purposes of this example, the tube is 'perfect' (ie there is no 'burn' on the CRT anywhere) and produces a full output at all points.

TABLE 1

| CRT Beam current | Burn Signal | Uncorrected Video signal | Burn corrected Video signal |
|---|---|---|---|
| 300 µA | 1.0 | 0.5 | 0.50 |
| 150 µA | 0.5 | 0.5 | 1.0 |
| 75 µA | 0.25 | 0.5 | 2.0 |
| 37.5 µA | 0.125 | 0.5 | 4.0 |
| 18.75 µA | 0.0625 | 0.5 | 8.0 |

From table 1, it can be seen that for each level of CRT beam current both the burn signal and the uncorrected video signal are measured. Software emulation is then used to determine the theoretical (as opposed to actually measured) burn corrected video signal.

It is important to realise that the absolute values in the table are merely examples. The important thing to understand is that this system considers ratios of the burn to uncorrected video. For example, the second value in the table (for 150 uA) could be a burn of 0.45 and an uncorrected video signal of 0.45, as this combination still gives a burn corrected signal of 1.0.

Considering now an 'imperfect tube (or at least a point or series of points on a tube that is imperfect, the burn circuitry will denote that these points are imperfect and correct as follows, with reference to Table 2 which shows the calculated virtual burn corrected video signals for a range of CRT beam currents and burn signals:

TABLE 2

| CRT Beam current | Burn Signal | Uncorrected Video signal | Burn corrected Video signal |
|---|---|---|---|
| 300 µA | 0.9 | 0.45 | 0.50 |
| 150 µA | 0.45 | 0.45 | 1.0 |
| 75 µA | 0.225 | 0.45 | 2.0 |
| 37.5 µA | 0.1125 | 0.45 | 4.0 |
| 18.75 µA | 0.0562 | 0.45 | 8.0 |

The characteristic obtained by varying the CRT beam current while holding the image signal I constant and calculating the virtual burn corrected video signals for each beam current is then used to construct a look up table between the virtual burn corrected video signals and PEC gain voltage (or the voltage applied to the photodetector). This table can be used as a 'lookup table', and say what PEC voltage is necessary on one day to repeat the same 'picture appearance' for given editorial settings as was derived on a previous day.

In a further implementation, this process can be automated, and initiated automatically at the request from the operator. This implementation could be carried out using general purpose software. In yet another implementation, this process could be repeated automatically using very fast hardware/software in the 'frame blanking' interval, where no active picture is being scanned. The very fast hardware is necessary, as there are only 49 'blanked' lines in the present European 625 line system of television transmission, and with a data rate of 25 full frames per second, the blanking interval is only $^{49}/_{625} \times ^{1}/_{25}$th of a second, or approximately 3 milliseconds. In High Definition this time is considerably shorter, and may well be of the order of microseconds not milliseconds.

Note that the previously proposed measurements are performed with an 'open gate' (i.e. no film loaded on the telecine). It is of course impossible to remove the film and replace it in $^{1}/_{25}$th or $^{1}/_{30}$th of a second, so a way of seeing around the film is necessary. This can be accomplished with a 'periscope' like device. Alternatively, it could be accomplished using a fibre-optic light guide arrangement or by passing light through the sprocket holes in the film.

Figure 2:
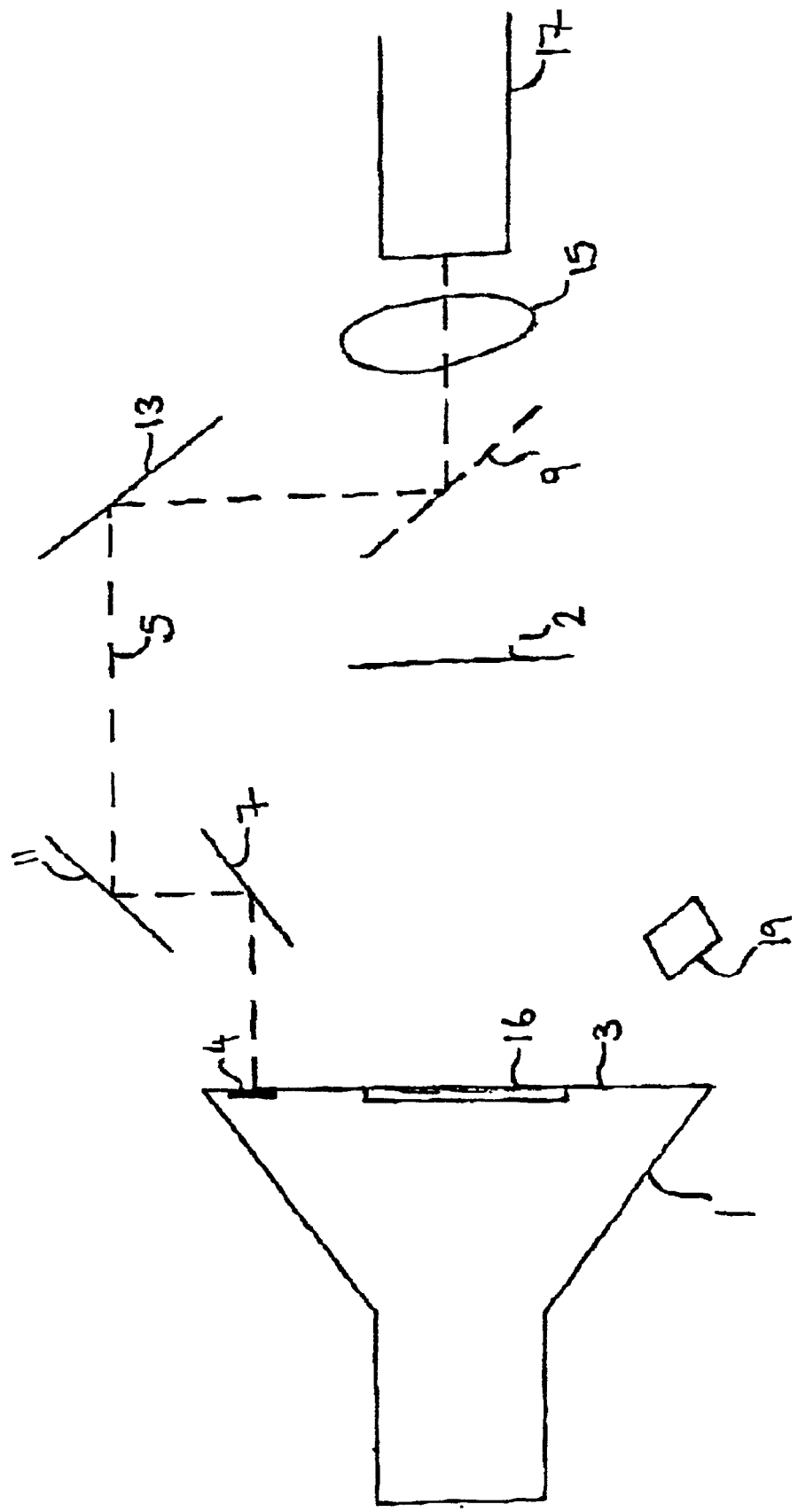
FIG. 2 is a diagram of a telecine system for use in accordance with the invention.

An example of the periscope type device is shown in FIG. 2, which shows a scanning CRT 1, a film 2 in a gate, a lens 15, a photomultiplier tube 17 and a burn correction detector 19. It will be appreciated that only one of the three colour channels of the telecine is shown in FIG. 2 for the sake of clarity. To enable the system to see around the film, mirrors 7, 9, 11 and 13 are used. Thus, a part 4 of the CRT face removed from the scan patch 16 is illuminated during the frame blanking interval and a first mirror 7 is arranged to deflect the light output therefrom via second and third mirrors 11, 13 to a semi-silvered mirror 9 which is arranged to deflect the light back into the path of the photomultiplier 17. The photomultiplier 17 is the same as the photosensitive detector which detects light transmitted by the film at other times during the frame scanning interval to provide the image information.

As shown, the mirrors are arranged in a "periscope" type arrangement. The device allows light which has not been modulated by the film to be recorded during the frame blanking interval, whereas modulated light from the scan patch can be recorded by the same photomultiplier 17 at other times.

An alternative to updating on every film frame, which has the associated high cost of fast hardware, is to utilise the system described above on a 'daily' basis, and to provide a simple 'update' correction. This may be done in several ways, including measuring one known point, comparing it with a previous value, and determining what to do. One action may be to take no action, as the point measures as before. Another action would be to notice that there has been a small 'drift' and to make a simple scaling correction for this drift. Yet another valid action may be that in the case of a large drift the system may inform the operator that the system is 'out of calibration', and that a full calibration cycle is needed.

The 'periscope' arrangement will be in the short term a very stable device but in the long term the relative transmission of partly silvered mirrors may change. An additional operational feature is to note the relative transmission of the periscope in comparison with the daily 'open gate' measurement. This allows the correction to be made for relative changes in the periscope transmission. Another important feature of the periscope arrangement is that it is important to never allow video overload of the uncorrected signal to occur. This can be achieved with the choice of suitable neutral density filters to be inserted into the periscope's optical path.

The following sets out a sequence of steps to be followed in the best known implementation of the calibration method of the invention when used to calibrate a telecine system such as that shown in FIGS. 1 and 2. In this implementation the calibration of the telecine light system is carried out once only before scanning a reel of film at the request of a user and is not carried out again until the user requests a recalibration of the system. All of the steps detailed below are carried out by the calibration software which is included in the telecine so that the user only has to initiate the calibration by commanding the software to run. The steps set out below show the steps taken to prepare for the iterative calibration method to be carried out.

Firstly, the software checks to see whether or not the CRT heater is on and, if not, the heater is switched on.

Then, other applications which could interfere with the system settings during calibration are blocked. Thus, the user interface to the telecine machine is locked out so that the user cannot alter the voltages applied to the system during calibration. In addition, the autoshading is locked so that it cannot be varied during the calibration process.

The software then records the initial settings for any parameters which could be changed during the calibration process, such as for example the beam current applied to the CRT. Other parameters for which the initial settings are recorded are the type of output (TV) format (i.e. the aspect ratio of the digital image output from the telecine machine) and the output links which show whether the digital image output from the telecine machine is for example in SD or HDTV (standard or high definition TV signal) format, or in full bandwidth R,G,B or 4:2:2 format.

The number of iterative loops to be used in calibrating the telecine system is then defined. The default number of loops with which the software runs is 32 as this is thought to provide acceptable results in all situations envisaged. However, a slider is provided on the telecine machine which allows a user to alter the number of iterative loops to be used if they wish. It will be appreciated that a reduction in the number of iterative loops would decrease the time taken to calibrate the system but might also compromise accuracy. Conversely, an increase in the number of iterative loops used should result in greater accuracy but would increase the time taken to calibrate the system.

The system is programmed to calibrate for inaccuracies in the black level clamping system of the burn detector as was described above. To do this, the software initiates the following steps:

1. The EHT (Extra high tension or voltage applied to the CRT) is disabled. Thus, no light will be emitted from the face of the CRT.

2. Calibration variables for the black level clamping system calibration are initialised. Thus, for example, the system sets the number of iterative calibration loops to be used.

3. For each of the three colour burn sensors separate readings of the digital output therefrom are taken, a running average of the readings is kept and the latest reading obtained is compared to the running average. When the latest reading and the running average have converged to acceptable limits, the burn sensor readings are deemed to have stabilised.

4. The latest readings obtained for each of the three colour burn detectors once the burn sensors are deemed to have stabilised are stored as the values of the black level applied by the clamping system to be used in correcting for errors in the clamping system.

Once the calibration of the clamping system has been completed, the software carries on with the main calibration and to do this, the EHT is reenabled.

The beam current applied to the CRT is then set to a nominal starting value which would usually be full current.

The CRT is then defocussed and an autoshading scan patch is created. Autoshading is well known in the art and provides a method of compensating the relative light levels emitted from different areas of a scan patch on the face of a CRT to account for unevenness in the levels of light transmitted over the area of the scan patch due to the optics of a system. Thus, for example, the optics of telecine systems are usually such that less light is transmitted from the corners of a scan patch and so the corners of the patch are made correspondingly brighter to compensate for this.

Next, any injected signal sources (e.g. test signals) are removed and the settings of each of the PECs (photo electric devices) in the telecine are zeroed to avoid saturation.

Once the steps outlined above have been carried out, the telecine is ready for the main calibration method in which:

For each of the target PEC gains of 0.5, 1, 2, 4, 8, 16 and 32, iterative steps are carried out with the CRT beam current set at the required level to find the PEC setting which allows a gain (i.e. a burn corrected video signal) corresponding to the target gain to be obtained for that PEC. Where the starting CRT beam current is 300 $\mu$A, the required burn corrected video signal or the "target gain" at each of the three image sensing photosensitive detectors $17r$, $17g$ and $17b$ will be 0.5. For the sake of clarity, the iterative calibration method is described in relation to only one of the three colour photodetectors. Target gains for each of the five first beam currents used during the calibration are given in Table 1 above. For the still smaller currents of 9.375 $\mu$A and 4.6875 $\mu$A the target gains will be 16 and 32 respectively.

The iterative steps carried out for each target gain in turn are as follows:

1. The system sets the CRT beam current to the next required value and then waits for the light level output from the CRT to stabilise.

2. Iteration variables for the target gain in question are then initialised.

3. A starting PEC setting or an initial voltage to apply to each of the photosensitive detectors is then determined using one of the three methods set out below:

a. the final PEC setting obtained during the last calibration run is used as a starting point (this is referred to as a "trim" calibration); or b. a fixed starting value such as for example full scale/4 could be used if the target gain loop in question is the first one (i.e. a target gain of 0.5); or c. the final PEC setting obtained for the last target gain loop is used.

4. Using the starting PEC setting found as above, the system loops through the following steps until the gain or corrected burn signal estimated by the software from the measured burn and uncorrected video signals remains within a defined tolerance of the target gain for a number of iterations defined by the iteration variables defined at point 2:

a. The PEC setting (which will be the starting setting for the first iteration, and the setting as modified at step d in the previous iteration for subsequent iterations) is written to the hardware and the software waits until the telecine system has settled;

b. The uncorrected video signal from the photodetector and the burn signal are read;

c. The measured gain (i.e. the virtual burn corrected video signal) is calculated from the uncorrected video and burn signals; and d. The PEC setting is modified in such a way that the error margin between the measured gain and target gain will be reduced in the next iteration;

e. The intermediate results are displayed as a bar graph showing the instantaneous error (as a percentage of target gain) and the PEC settings.

5. The final PEC setting resulting from step 4 is stored.

6. The system is then ready to calibrate for the next target gain and so it halves the CRT beam current, thus returning to step 1.

Once the system has looped through each of the target gains defined above and the results for each have been stored, the parameter settings are reset to their saved initial values and the block on other applications changing the system settings is released.

The data resulting from the iteration sequence performed is collected and presented as a graph of measured PEC settings against the measured gain (i.e. video level divided by burn level). The corresponding curves for the existing calibration are then presented to a user for reference.

The data set found from the calibration is then either applied immediately to the telecine or is stored for future use after approval by a user.

Whilst the invention has been described with reference to one channel of a telecine, in practice the technique can be applied separately to each of the channels of a colour telecine.

The invention has been described with reference to specific embodiments. It will be apparent to those skilled in the art that modifications may be made without departing from the spirit and scope of the invention as set forth in the appended claims.

What is claimed is:

1. A method of calibrating the light system in a flying spot scanner or telecine machine using a cathode ray tube light source, a photosensitive detector, and a burn corrector system, the burn corrector system being operative during the calibration and serving to adjust a control signal for the photosensitive detector in accordance with variations in the output of the cathode ray tube, wherein:

at a first level of drive current for the cathode ray tube a control signal to the photosensitive detector is adjusted to obtain a desired video signal parameter, and the value of the control signal is noted;

at a plurality of other levels of cathode ray tube drive current, the control signal to the photosensitive detector is adjusted to obtain desired video signal parameters, and the values of the respective control signals are noted; and a lookup table is created calibration values for different levels of light, so that during normal operation of the telecine machine values in the lookup table can be used to obtain calibration information for different levels of light transmitted to the photosensitive detector;

wherein the video signal parameters are virtual video signal levels taking into account signals from the burn detector.

2. A method as claimed in claim 1, wherein the burn detector includes a black level clamping system which is calibrated prior to adjusting and recording the control signals at the various light levels so as to account for inaccuracies in the black level burn clamping system on the results of the calibration method.

3. A method as claimed in claim 1, wherein the virtual video signal levels are obtained using a software implementation of the burn correction circuitry present in the scanner or telecine machine.

4. A method as claimed in claim 3, wherein the actual video signal levels obtained at the photosensitive detector and corresponding signals from the burn detector are used by the software implementation of the burn correction circuitry to calculate the virtual video signal levels.

5. A method as claimed in claim 4, wherein the method is carried out in a frame blanking interval during which no film image is being scanned such that the calibration can be carried out for each frame of film.

6. A method as claimed in claim 1, wherein any shading correction provided in the scanner or telecine machine is disabled prior to adjusting and recording the control signals at the various light levels.

7. A method as claimed in claim 1, wherein the user interface to the flying spot scanner or telecine is locked out prior to adjusting and recording the control signals at the various light levels.

8. A method as claimed in claim 1, wherein the initial settings of parameters of the flying spot scanner or telecine which will be altered during the calibration process are recorded prior to adjusting and recording the control signals at the various light levels.

9. A method as claimed in claim 1, the method being automated such that it can be carried out automatically at the request of a user.

10. A method as claimed in claim 1, wherein the adjustment of the control signal to the photosensitive detector is carried out iteratively.

11. A method as claimed in claim 10, wherein means are provided for allowing a user to specify the number of iterative loops required.

12. A method as claimed in claim 1, wherein the method is carried out in a frame blanking interval during which no film image is being scanned such that the calibration can be carried out for each frame of film.

13. A method as claimed in claim 12, wherein means are provided for allowing light which has not been modulated by the film in the scanner or telecine to be detected by the photosensitive detector during the frame blanking interval.

14. A method as claimed in claim 13, wherein light which has not been modulated by the film is detected from a part of the surface of the cathode ray tube which is not normally used for scanning the film and which is illuminated during the frame blanking interval.

15. A method as claimed in claim 14, wherein the means for allowing light which has not been modulated by the film to be detected comprises semi-silvered and/or fully silvered mirrors for deflecting light from the CRT around the film.

16. A method as claimed in claim 15, wherein the mirrors are arranged in a periscope type arrangement.

17. A method as claimed in claim 15, wherein the mirrors are arranged to deflect only the light emitted from the part of the surface of the cathode ray tube which is not normally used for scanning the film.

18. A method as claimed in claim 15, wherein neutral density filters are provided in the optical path of the mirrors to avoid video overload of the uncorrected signal from occurring.

19. Software for automatically implementing the method as claimed claim 1.

20. Apparatus for implementing the method as claimed in claim 1.

21. A method of calibrating the light system in a flying spot scanner or telecine machine using a cathode ray tube light source, a photosensitive detector which will always obtain a video signal corresponding to the level of light transmitted to it, and a burn corrector system, the burn corrector system being operative during the calibration and serving to adjust a control signal for the photosensitive detector in accordance with variations in the output of the cathode ray tube, the method comprising:

(A) performing a first calibration including carrying out the following functions when there is no film in the scanner:

(i) at a first level of light transmitted to the photosensitive detector, the photosensitive detector obtaining an actual video signal corresponding to the level of light, adjusting a control signal to the photosensitive detector to obtain a predetermined video signal and noting the value of the control signal;

(ii) at a plurality of other levels of light transmitted to the photosensitive detector, the photosensitive detector obtaining an actual video signal corresponding to each of the other levels of light, adjusting the control signal to the photosensitive detector to obtain the predetermined video signal and noting the values of the respective control signals; and (iii) creating a lookup table of calibration values for different levels of light transmitted to the photosensitive detector, so that during normal operation of the telecine machine values in the table can be used to obtain calibration information for different levels of light transmitted to the photosensitive detector:

(B) applying the lookup table to data obtained subsequent scanning operations until the first calibration method is repeated;

(C) performing the calibration method as claimed in claim 8; and (D) comparing the actual video signals obtained by the photodetector during the first calibration with the actual video signals obtained when calibrating the system according to the method of claim 14, so as to detect any change over time in the levels of the actual video signals obtained.

* * * * *